United States Patent [19]
Katayama

[11] Patent Number: 5,157,741
[45] Date of Patent: Oct. 20, 1992

[54] IMAGE PROCESSING METHOD AND APPARATUS FOR OUT-PUTTING DOT-PROCESSED DATA WITH SUPPRESSION OF FALSE CONTOURS AND OTHER NOISE

[75] Inventor: Akihiro Katayama, Kawasaki, Japan

[73] Assignee: Canon Kabushiki Kaisha, Tokyo, Japan

[21] Appl. No.: 718,904

[22] Filed: Jun. 24, 1991

Related U.S. Application Data

[63] Continuation of Ser. No. 192,601, May 11, 1988, abandoned.

[30] Foreign Application Priority Data

May 18, 1987 [JP] Japan .................. 62-121611
May 18, 1987 [JP] Japan .................. 62-121612
May 18, 1987 [JP] Japan .................. 62-121613

[51] Int. Cl.⁵ ............................ G06K 9/40
[52] U.S. Cl. ...................... 382/54; 358/459; 358/462; 358/467; 382/50
[58] Field of Search .............. 382/54, 27, 50, 52; 358/429, 462, 459, 455, 456, 457, 465, 467; 364/518, 523; 395/100, 118, 128

[56] References Cited

U.S. PATENT DOCUMENTS

| | | | |
|---|---|---|---|
| 4,196,453 | 4/1980 | Warren | 382/56 |
| 4,266,249 | 5/1981 | Chai et al. | 358/429 |
| 4,595,956 | 6/1986 | Kawamora et al. | 358/459 |
| 4,651,287 | 3/1987 | Tsao | 364/518 |
| 4,654,721 | 3/1987 | Goertzel et al. | 358/459 |
| 4,668,995 | 5/1987 | Chen et al. | 382/54 |
| 4,740,818 | 4/1988 | Tsilibes et al. | 358/456 |
| 4,853,970 | 8/1989 | Ott et al. | 382/54 |

OTHER PUBLICATIONS

"A survey of Electronic Techniques for Pictorial Image Reproduction", in IEEE Transactions on Communications, vol. COM-29, No. 12, Dec. 1981, pp. 189-1925 (Stoffel et al.).

Primary Examiner—Joseph Mancuso
Attorney, Agent, or Firm—Fitzpatrick, Cella, Harper & Scinto

[57] ABSTRACT

There is disclosed an image processing method for reproducing an image with high quality, by dividing the image data into plural blocks, converting each block into a dot pattern, and binary digitizing the thus obtained dot pattern.

14 Claims, 9 Drawing Sheets

FIG. 4

| $D_{11}$ | $D_{12}$ | $D_{13}$ |
|---|---|---|
| $D_{21}$ | $D_{22}$ | $D_{23}$ |
| $D_{31}$ | $D_{32}$ | $D_{33}$ |

FIG. 5

| $A_{11}$ | $A_{12}$ | $A_{13}$ |
|---|---|---|
| $A_{21}$ | $A_{22}$ | $A_{23}$ |
| $A_{31}$ | $A_{32}$ | $A_{33}$ |

IMAGE PROCESSING METHOD AND APPARATUS FOR OUT-PUTTING DOT-PROCESSED DATA WITH SUPPRESSION OF FALSE CONTOURS AND OTHER NOISE

This application is a continuation of application Ser. No. 07/192,601, filed May 11, 1988, now abandoned.

BACKGROUND OF THE INVENTION

1. Field of the Invention

The present invention relates to an image processing method for processing an image in the form of digital signal and an apparatus therefor, and more particularly to an image processing method for reproducing an image with high quality and an apparatus therefor.

2. Related Background Art

There is already known the error dispersion method as a binary digitizing method for reproducing intermediate tone in digital printers or digital facsimile apparatus. In said error dispersion method, the difference in density between the original input image and the output image after processing is calculated for each pixel, and the error obtained in said calculation is dispersed into surrounding pixels with predetermined weighting. Said error dispersion method was presented by R.W. Floyd and L. Steinberg in "An Adaptive Algorithm for Spatial Gray Scale", SID 75 Digest (1976).

Such error dispersion method can conserve the density of the input image in the output image, and, lacking periodicity in the processing, is free from Moire fringe patterns encountered in other binary digitizing methods such as the dither method or density pattern method, but is associated with the drawbacks of particular fringe patterns in the uniform density area (nonedge area) of the image or granular noises due to dispersed dots particularly in the highlight area of the image, thus leading to the deterioration of image quality.

For avoiding these drawbacks, U.S. Pat. No. 4,876,610 proposes a method of discriminating the characteristic of image and dispersing the error according to the result of said discrimination. Also, U.S. Pat. No. 4,878,125 proposes a method of varying the ratio of dispersion of error into the surrounding pixels according to the amount and direction of edge present in the image, and U.S. patent application Ser. No. 145,593 filed Jan. 19, 1988, proposes a method of dividing the original image into blocks, digitizing the image in each block and dispersing the error in said digitization into surrounding blocks. Both mentioned patents and the patent application are assigned in common with the present invention.

SUMMARY OF THE INVENTION

An object of the present invention is to provide an image processing method, and an apparatus therefor, free from the above-mentioned drawbacks of the conventional technology and capable of reproducing any original image with high quality and high resolution.

Another object of the present invention is to provide an improvement on the image processing method for digitizing input image data, and the apparatus therefor.

Still another object of the present invention is to provide an image processing method capable of providing a high quality image by an improvement on the error dispersion method used for intermediate tone processing of image, and an apparatus therefor.

Still another object of the present invention is to provide an image processing method capable of high speed image processing, and an apparatus therefor.

Still another object of the present invention is to provide an image processing method capable of satisfactory image reproduction by digitizing after the image is converted into a dot pattern, and an apparatus therefor.

Still another object of the present invention is to provide an image processing method capable of satisfactory image reproduction with a simple structure, and an apparatus therefor.

Still another object of the present invention is to provide an image processing method capable of providing a reproduced image faithful to the original image by conservation of density before and after the formation of the dot pattern, and an apparatus therefor.

Still another object of the present invention is to provide an image processing method capable of satisfactory image reproduction without deterioration in the resolution, by selecting or not the dot pattern formation depending on the characteristic of the original image, and an apparatus therefor.

The foregoing and still other objects of the present invention, and the advantages thereof, will become fully apparent from the following detailed description of the preferred embodiments, which is to be taken in conjunction with the attached drawings.

BRIEF DESCRIPTION OF THE DRAWINGS

FIG. 4 is a view illustrating input data of 3×3 pixels;

FIG. 5 is a view illustrating data after dot forming process;

FIG. 6-1 is a block diagram showing the details of a binary digitizing circuit 18 shown in FIG. 1;

FIG. 6-2 is a chart showing an example of weighting coefficients;

DETAILED DESCRIPTION OF THE PREFERRED EMBODIMENTS

Now the present invention will be clarified in detail by embodiments thereof shown in the attached drawings.

Figure 1:
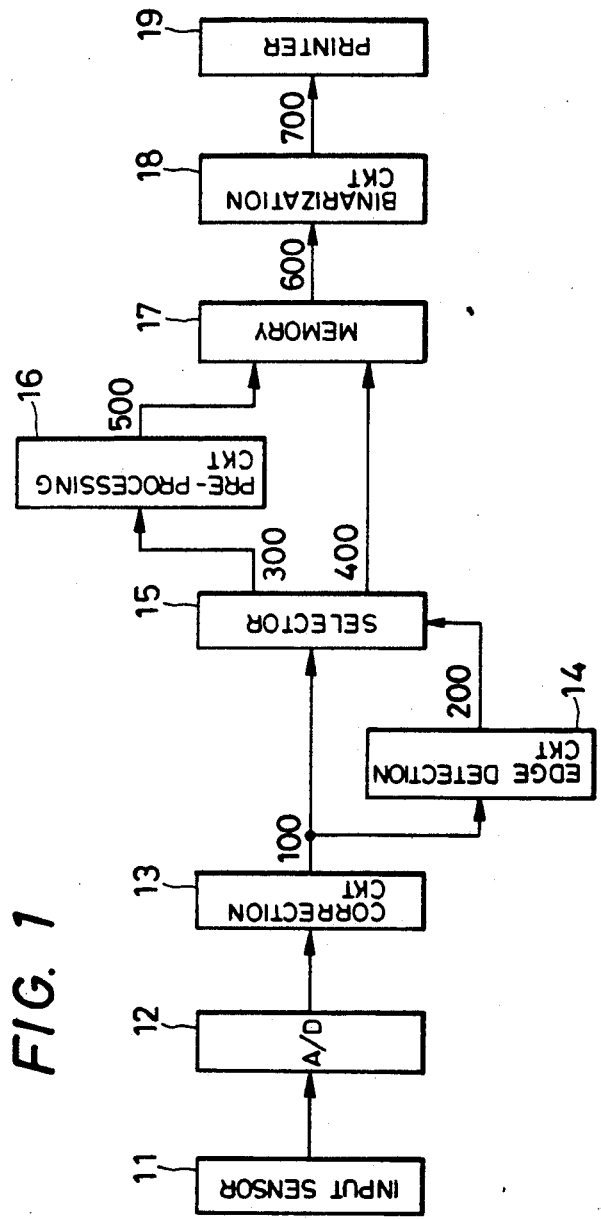
FIG. 1 is a block diagram of a first embodiment of the present invention.

FIG. 1 is a block diagram showing an embodiment of the present invention, wherein an input sensor 11 is composed of a photoelectric conversion device such as CCD and a driving unit therefor, and reads the original image by scanning. The image data obtained from the original image by the input sensor 11 are supplied to an A/D converter 12 for conversion of data of each pixel into digital data of 8 bits or 256 levels.

Then a correction circuit 13 executes digital shading correction for compensating for unevenness in the sensitivity of the CCD sensor or in the luminosity of light source. The corrected data 100 are supplied to an edge detection circuit 14 and a selector 15.

The data are transferred in units of blocks of m×n pixels each. In the present embodiment there will be explained a case of m=3, n=3. Said transfer in block units can be achieved by a structure employing a line memory of three lines, or a structure in which image data are stored in the units of a page and are then read in units of blocks of 3×3 pixels each.

The edge detection circuit 14 discrimiantes whether an edge is present in the block, for example by using a Laplacian of 3×3 pixels or by comparing the difference between the maximum and minimum values in the block with a threshold value $T_1$ (=15 in the present embodiment) and identifying the presence or absence of an edge if said difference is respectively larger or smaller than the threshold value. The present embodiment employs the latter method, and the threshold value $T_1$ is determined experimentally. The discrimination of the presence of an edge in the block is conducted for selecting the dot forming (or conversion) process or not. In a block containing an edge, namely in an area containing portions of characters, the dot forming process is not adopted, in order to prevent deterioration in resolution associated with such dot formation. The edge detection circuit 14 discriminates the presence of edges as explained above, and releases a signal 200 which is "1" or "0" respectively in the presence or absence of edges. Said signal 200 is supplied to the selector 15, which transfers the received data 100 as data 300 in units of blocks to a pre-processing circuit 16 if the signal 200 is "0", indicating the absence of edges, but transfers said data 100 as data 400 to a memory 17 if said signal 200 is "1", indicating the presence of an edge.

In this manner the selector 15 is provided for conducting the pre-processing only in an area without edges, as identified by the edge detection circuit 14.

The pre-processing circuit 16 executes dot formation (or conversion) by summing the data of the block entered as the signal 300, and replacing said sum of densities in the block by the density of a pixel or plural pixels in a block. Such dot formation in a uniform density area not containing edges provides a periodic arrangement of dots, thus suppressing particular fringe patterns experienced in binary digitizing in the binarizing circuit to be explained later, for example with the error dispersion method.

Data 500 after dot forming in the preprocessing circuit 16 are supplied to a memory 17 and are synthesized with the data 400 of the edge containing area(s). The data 600 read from the memory 17 in units of pixels are supplied to a binary digitizing circuit 18 for binary digitizing using the error dispersing method. The obtained result 700 is supplied to a printer 19 for forming an image by turning on and off the dots according to the binary data 700.

Figure 2:
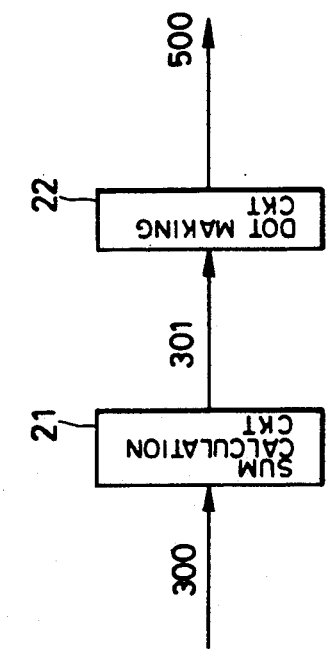
FIG. 2 is a block diagram showing the details of a pre-processing circuit 16 shown in FIG. 1.
Figure 3:
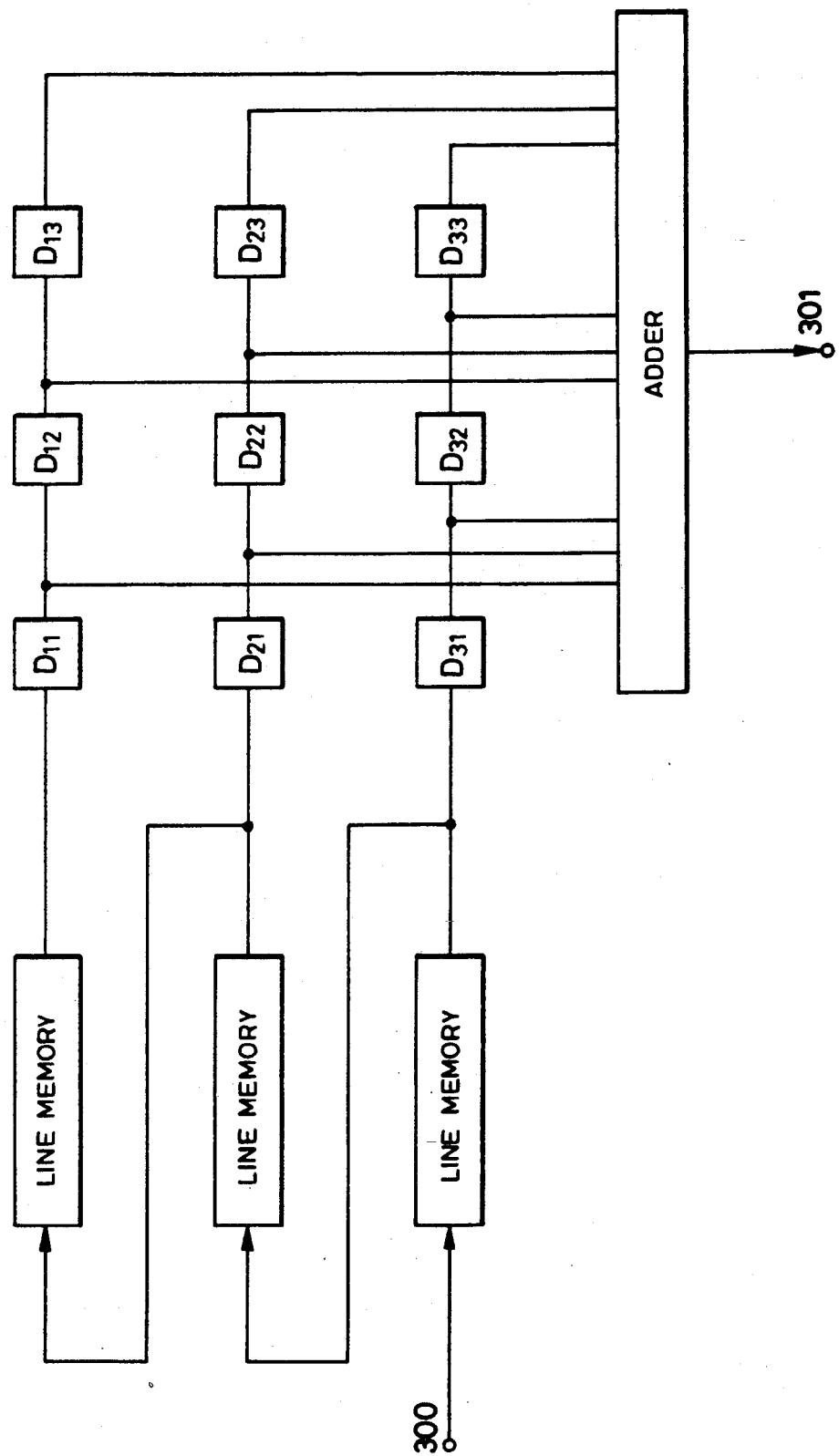
FIG. 3 is a block diagram showing the details of a sum calculation circuit 21 shown in FIG. 2.

FIG. 2 is a block diagram of the preprocessing circuit 16 shown in FIG. 1, for dot forming for the blocks not containing edges. The data 300 from the selector 15 are supplied to a sum calculation circuit 21 for calculating the sum S of the densities of the nine data (3×3 pixels) in the block, according to the following equation:

$$S = \sum_{i=1}^{3}\sum_{j=1}^{3} D_{ij} \quad (1)$$

wherein $D_{ij}$ is the density of a pixel (i, j) in the block. FIG. 3 is a block diagram of the sum calculation circuit 21. The sum S of density is supplied as a signal 301 to a dot forming circuit 22.

FIG. 4 illustrates density data of an input block (3×3 pixels), wherein $D_{ij}$ (i=1, 2, 3; j=1, 2, 3) represents the density of the pixel (i, j).

FIG. 5 illustrates the density after dot forming processing, wherein $A_{ij}$ (i=1, 2, 3; j=1, 2, 3) represents the density of the pixel (i, j).

Assuming that $D_{max}$ is the maximum density produced by the printer, namely the density of a dot printed by the printer, the dot forming circuit 22 forms dots in the following manner:

i) When $S \leq D_{max}$;
$A_{22} = S$
density for other pixels = 0
ii) When $D_{max} < S \leq 5D_{max}$;
$A_{22} = D_{max}$
$A_{12} = A_{21} = A_{23} = A_{32} = (S - D_{max})/4$
density for other pixels = 0
iii) When $S > 5D_{max}$;
$A_{12} = A_{21} = A_{22} = A_{23} = A_{32} = D_{max}$
density for other pixels = $(S - 5D_{max})/4$ wherein S is the sum of density obtained from the sum calculation circuit 21 shown in FIG. 2, and $A_{ij}$ (i=1, 2, 3; j=1, 2, 3) is the density of pixel (i, j) in the block after dot formation.

The dots can be formed in this manner, and the formation of such periodic pattern prior to the binary digitizing allows suppression of particular patterns generated in the binary digitization for example with the error dispersing method. Also, said periodic structure allows prevention of formation of granular noises. The data 500 obtained by said dot formation are supplied to the memory 17.

Figures 2, 6:
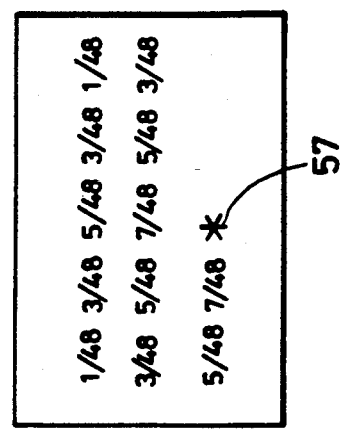
Figures 1, 6:
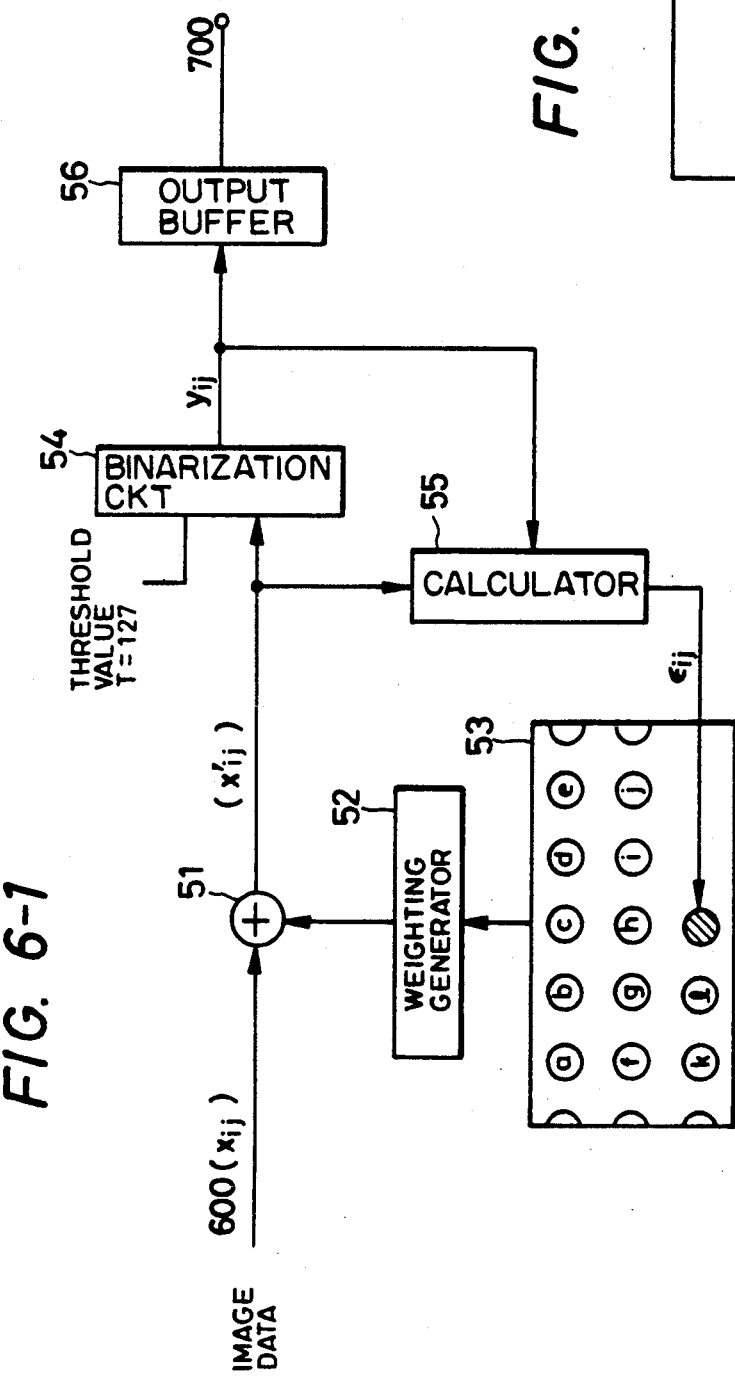

FIG. 6-1 is a block diagram showing the details of the binarizing circuit 18 shown in FIG. 1. The image data 600 ($X_{ij}$) read from the memory 17 are added, in an adder 51, with data which are obtained by multiplying errors $\epsilon_{ij}$ generated in the preceding binary digitizing and stored in an error buffer memory 53 by weighting coefficients $\alpha_{kl}$ in a weighting generator 52 and then normalized by division by $\Sigma \alpha_{kl}$.

This operation can be represented by the following equation:

$$X_{ij}' = X_{ij} + \frac{\Sigma(\alpha_{kl} \cdot \epsilon_{i+j,j+l})}{\Sigma \alpha_{kl}}$$

In the first binary digitizing, the errors are not stored in the error buffer memory and are therefore not added to the input data.

FIG. 6-2 shows an example of the weighting coefficients, wherein 57 indicates the pixel position undergoing processing, and the values in the matrix are larger as they are closer to said pixel position under processing. The weighting generator 52 executes respective multiplications of the data a, b, c, ..., l of the error buffer memory 53 with 1/48, 3/48, 5/48, ..., 7/48 shown in FIG. 6-2 and sends the sum of these multiplications to the adder 51, so that the data of the error buffer memory positioned close to the pixel position 57 undergoing processing are given heavier weighting.

The errors $\epsilon_{ij}$ stored in the error buffer memory 53 represent differences between the correction data $x'_{ij}$ obtained in the adder 51 prior to the currently processed data and the binarized output data $y_{ij}$.

The corrected data $x'_{ij}$ obtained by addition in the adder 51 are then compared with a threshold value T in the binarizing circuit to generate data $y_{ij}$, which are in a binarized state, for example $y_{max}$ or $y_{min}$, such as "255" or "0".

On the other hand, a calculator 55 determines the difference between the corrected data $x'_{ij}$ and the output data $y_{ij}$, and said difference is stored in a memory position in the error buffer memory 53 corresponding to the pixel position 57 undergoing processing. The next image data are then processed in the same manner, and the obtained error $\epsilon_{ij}$ is stored in the next right position in the error buffer memory 53. The binary digitization in the error dispersing method is achieved by repeating the above-explained operation.

In the above-explained embodiment, dots are generated and arranged in regular manner in the uniform density areas not containing edges, so that specific patterns inherent to the error dispersing method can be suppressed.

Figure 7:
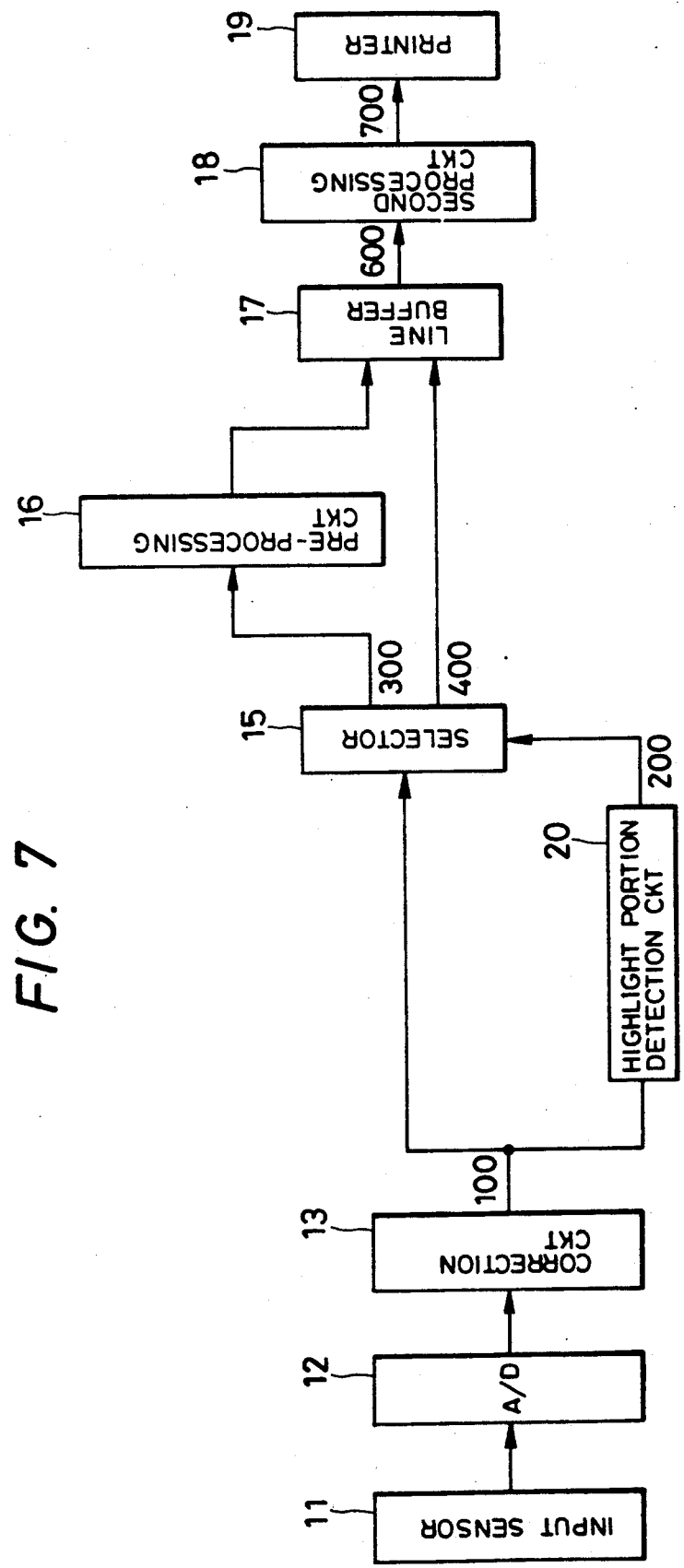
FIG. 7 is a block diagram showing a modification of the embodiment shown in FIG. 1.

The dot formation can, if wished, be performed only in the highlight area, by replacing the edge detection circuit 14 shown in FIG. 1 by a highlight area detection circuit 20 shown in FIG. 7. Said highlight area detection circuit 20 is so constructed that a highlight area is identified when the maximum density in 9 $(=3\times 3)$ pixels in the block does not exceed a threshold value $T_3$ (for example $T_3=20$). Dot formation in the highlight area allows rearrangement of dispersed dots into a regular array of dots of a short pitch, thereby producing regularity without sense of noise, and preventing granular noises experienced in highlight areas.

In the foregoing embodiment the dot formation is conducted according to whether an edge or a highlight area is identified in the block. In the following embodiment, the extent of dot formation is changed stepwise according to the density of the input image, thereby achieving smooth image processing.

Figure 8:
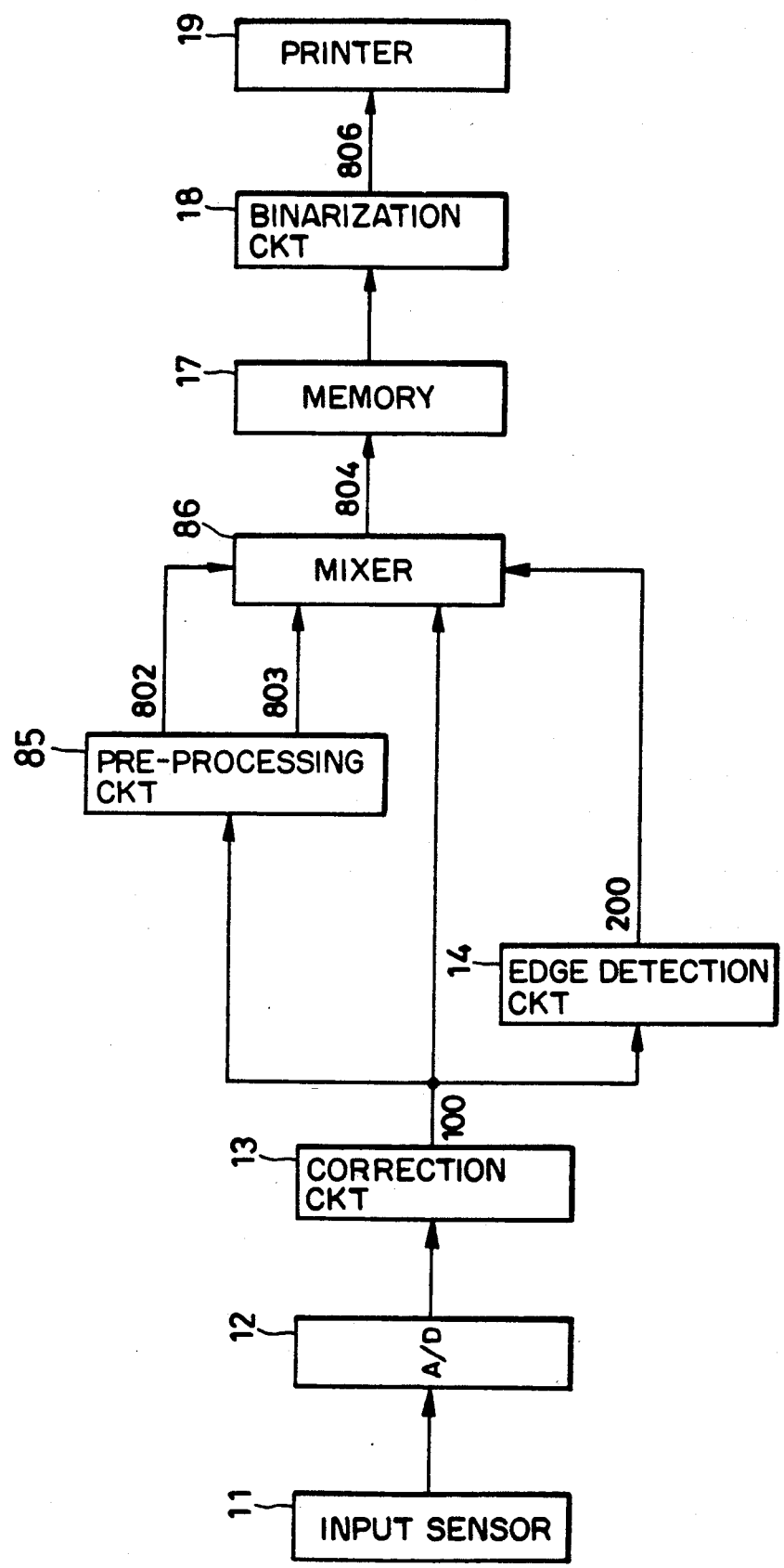
FIG. 8 is a block diagram of a second embodiment.

FIG. 8 is a block diagram of an embodiment in which the extent of dot formation is switched stepwise according to the density of the input image, wherein the same components or signals as in FIG. 1 or 7 are represented by the same numbers.

The signal 100 corrected by a correction circuit 13 is supplied to an edge detection circuit 14, a pre-processing circuit 16 and a mixer 86. Said signal is transferred in the unit of a block of $m\times n$ pixels. In the following explanation it is assumed that $m=n=3$, but there may naturally be selected other conditions such as $m=n=5$ or $m=3$ and $n=5$.

The edge detection circuit 14 discriminates whether the block contains an edge, and releases a signal 200 which is "1" or "0" respectively if any edges are present or absent in the block.

Figure 9:
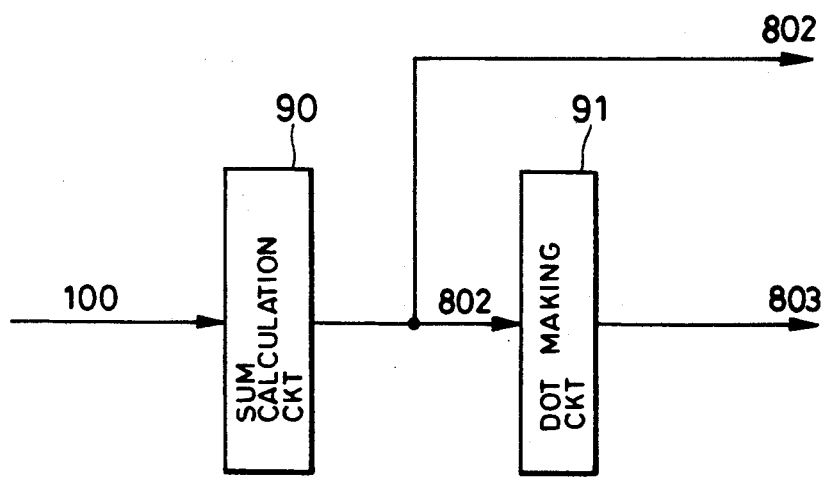
FIG. 9 is a block diagram showing the details of pre-processing circuit 85 shown in FIG. 8.

FIG. 9 is a block diagram of the preprocessing circuit 85. The corrected signal 100 is supplied to a sum calculation circuit 90 for calculating the sum S of density in the block according to the following equation:

$$S = \sum_{i=1}^{3} \sum_{j=1}^{3} D_{ij}$$

The calculated sum S is supplied as a signal 802 to the mixer 86 and a dot forming circuit 91, which effects dot formation according to the sum S. The sum calculation circuit 90 and the dot forming circuit 91 can be the same as the sum calculation circuit 21 and the dot forming circuit 22 shown in FIG. 2. The data after dot formation are supplied, as a signal 803, to the mixer 86.

Figure 10:
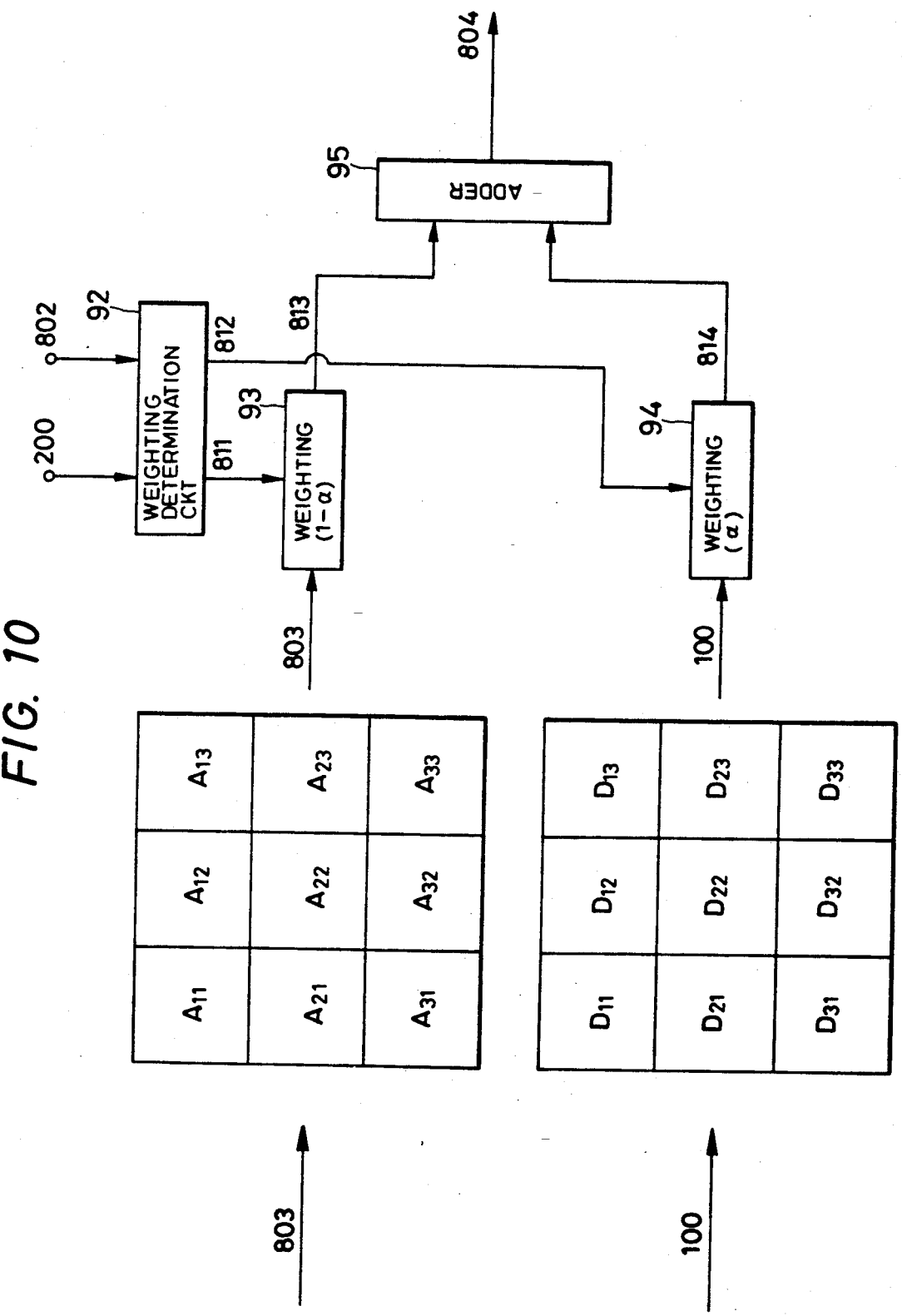
FIG. 10 is a block diagram showing the details of mixer 86 shown in FIG. 8.

FIG. 10 illustrates the process in the mixer 86. The signal 802 from the pre-processing circuit 16 and the signal 200 from the edge detection circuit 14 are supplied to a weighting determination circuit 92, which releases weighting signals 811, 812 according to the signals 200, 802. The weighting signals 811, 812 are respectively represented as $1-\alpha$ and $\alpha$ ($0\leq\alpha\leq 1$). These signals are respectively supplied to weighting circuit 93, 94 to obtain weighted signals 813, 814. An adder 95 adds the signals 813, 814 to obtain a signal 804.

In the following there will be explained the function of the present embodiment, wherein $A_{ij}$ (i, j=1, 2, 3) represents the data 803 subjected to dot formation, while $D_{ij}$ (i, j=1, 2, 3) represents the original data 100. The weighting determination circuit 92 receives the signals 200, 802, in which $\alpha$ is taken as "1" when the signal 200 is "1" indicating the presence of an edge in the block. In this state the signals 811 and 812 are respectively "0" and "1". As in the foregoing embodiment, the dot formation is not conducted in the edge portion in order not to degrade the resolution.

Figure 11:
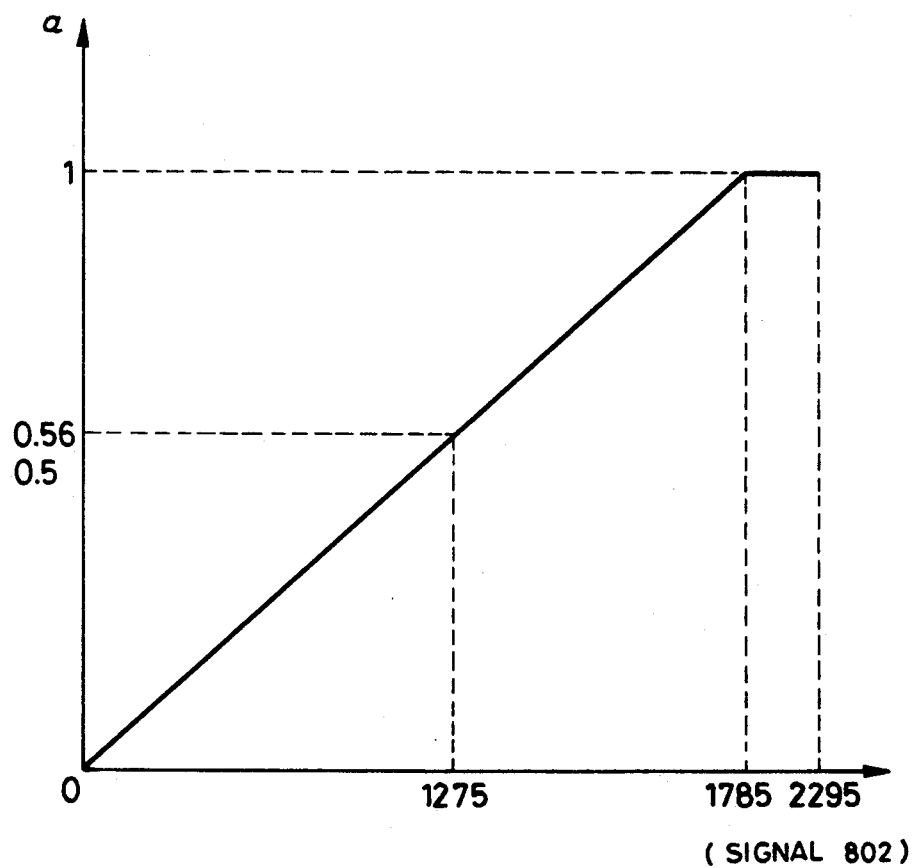
FIG. 11 is a chart showing the relation between the image density and the dispersion rate $\alpha$.

When the signal 200 is "0", indicating the absence of edges in the block, the value of $\alpha$ is determined according to the value of the signal 802 as shown in FIG. 11. For example, if the signal 802 is "1275", the signal 812 ($\alpha$) and the signal 811 ($1-\alpha$) are respectively taken as 0.56 and 0.44. FIG. 11 shows only an example of the relationship between the signal 802 and $\alpha$, and said relationship is not limited to this example. Also, the dot formation may be made at an arbitrary density of the signal 802 by suitably varying the relationship between the signal 802 and $\alpha$. Said relationship can be set in a look-up table. The dot-formed data 803 ($A_{ij}$) are multiplied by $1-\alpha$, while the original data 100 ($D_{ij}$) are multiplied by $\alpha$, and the thus weighted data 813, 814 are added in the adder 95. Thus the result 804 of addition is obtained according to the following formula:

$$804 = (1-\alpha)A_{ij} + \alpha \cdot D_{ij}$$
$$(i, j = 1, 2, 3)$$

As explained in the foregoing, the dot formation in the non-edge areas allow prevention of deterioration in the resolution, and the stepwise weighting enables smooth dot formation of the image according to the density. In this manner it is rendered possible to prevent generation of false contour or noises by the dot formation.

The signal 804 from the mixer 86 is supplied to the memory 17, and the signal 805 read from said memory 17 is supplied to a binary digitizing circuit 18 for binary digitizing. Said binary digitizing circuit 18 can be the same as the circuit 18 shown in FIG. 1 or 7. The signal 806 from said circuit 18 is supplied to a printer 89 for reproducing a binary image.

The above-explained embodiment, in which the dot formation is conducted only in the non-edge areas through edge detection or in the highlight areas through highlight area detection, provides periodic arrangement in the dot arrangement, thereby suppressing particularly fringe patterns encountered in the binary digitizing, for example, in the error dispersion method. Also, dot formation in the highlight areas enables regular arrangement of dots, thus preventing the granular noises. Besides, the mixing, after weighting, of the original data and the data subjected to dot formation according to the image density suppresses the noises generated in the dot formation, and eliminates false contours. Furthermore there can be obtained a reproduced image faithful to the original image, since the original data can be preserved in the dot formation.

The foregoing embodiments can be applied also to a color image, by employing the circuit shown in FIG. 1, 7 or 8 in three sets respectively for red, green and blue (or other sets of three colors or the equivalent). In the case of having a circuit like that of FIG. 8 for each of three colors, the relationship between the signal 802 and α shown in FIG. 11 may be varied for respective colors.

The present invention has been explained by reference to the preferred embodiments thereof, but it is not limited to such embodiments and is subject to various modifications within the scope and spirit of the appended claims.

What is claimed is:

1. An image processing apparatus comprising:
   division means for dividing an input image into plural blocks, each block comprising n bits of digital image data of each of plural pixels, n being greater than 1;
   calculation means for calculating, for each block, a sum of the digital image data of the plural pixels in that block;
   conversion process means for executing, for each block, a conversion processing on the digital image data of the plural pixels within that block, according to the sum of the digital image data of the plural pixels obtained by said calculation means; and
   binarizing means for binarization processing the digital image data of said plural pixels converted by said conversion process means, pixel by pixel,
   wherein said binarizing means further comprises correction means for correcting an error generated when the digital image data of one pixel is binarized, by diffusing the error to the digital image data of peripheral pixels of the one pixel, and
   wherein said conversion process means executes the conversion processing to concentrate density of the digital image data to a predetermined position within the block, by assigning a respective new multi-bit image data value to each pixel within the block, such that the sum of the new multi-bit image data values equals the sum obtained by said calculation means, and such that dots obtained by the binarization processing are aligned.

2. An image processing apparatus according to claim 1, wherein said conversion process means is structured and arranged to vary a proportion of dot image in the block according to the sum of plural image data in said block.

3. An image processing apparatus according to claim 1, further comprising detection means for detecting a characteristic of image from plural digital image data in said block.

4. An apparatus according to claim 3, further comprising selection means for effecting or not the conversion processing in said conversion process means, wherein said selection means is structured and arranged to select or not the conversion processing according to the characteristic of image detected by said detection means.

5. An image processing apparatus according to claim 4, wherein said selection means is structured and arranged to cause said conversion process means to effect the conversion processing when said detection means detects a non-edge area.

6. An image processing apparatus according to claim 4, wherein said selection means is structured and arranged to cause said conversion process means to effect the conversion processing when said detection means detects a highlight area.

7. An image processing apparatus according to claim 1, further comprising output means for display or output of the image binarized by said binarizing means.

8. An image processing apparatus according to claim 1, further comprising memory means for storing the image subjected to conversion processing by said conversion process means.

9. An image processing apparatus comprising:
   input means for entering image data of plural blocks, each block comprising n bits of digital image data for each of plural pixels, n being greater than 1:
   detection means for detecting a characteristic of the image from the image data;
   processing means for effecting dot forming processing on the image data of the plural pixels of each block; and
   binarizing means for binarization processing the image data of said plural pixels, pixel-by-pixel,
   wherein said processing means is structured and arranged to process the image data of the plural pixels to concentrate density of the image data to a predetermined position, by assigning a respective new multi-bit image data value to each pixel within the block, such that a sum of the new multi-bit image data values equals a sum of values of the image data of the pixels of said block before processing by said processing means, and such that dots obtained by the binarizing process are aligned, and
   wherein said binarizing means is structured and arranged to binarize, pixel-by-pixel, the image data of the plural pixels after the image data has been subjected to dot forming processing by said processing means using the image data of said plural pixels in a case where a predetermined characteristic of the image is detected by said detecting means, and said binarizing means further comprises correction means for correcting an error generated when the image data of one pixel is binarization processed.

10. An image processing apparatus according to claim 9, wherein said input means comprises dividing means for dividing an image into plural blocks.

11. An image processing apparatus according to claim 10, wherein said processing means is structured and arranged to effect dot forming processing according to image data of each of the thus divided blocks.

12. An image processing apparatus according to claim 9, wherein said detection means is structured and arranged to detect whether the image is in a non-edge area, and said binarizing means is adapted to binarize the image data subjected to dot forming processing by said processing means when a non-edge area of the image is detected.

13. An image processing apparatus according to claim 9, wherein said detection means is structured and arranged to detect whether the image is in a highlight area, and said binarizing means is adapted to binarize the image data subjected to dot forming processing by said processing means when a highlight area of the image is detected.

14. An image processing apparatus according to claim 9, further comprising output means for display or output of the image digitized by said digitizing means.

* * * * *

UNITED STATES PATENT AND TRADEMARK OFFICE
CERTIFICATE OF CORRECTION

PATENT NO. : 5,157,741
DATED : October 20, 1992
INVENTOR(S) : AKIHIRO KATAYAMA

It is certified that error appears in the above-identified patent and that said Letters Patent is hereby corrected as shown below:

On the title page:

IN [54] TITLE

"OUT-PUTTING" should read --OUTPUTTING--.

IN [56] REFERENCES CITED

Under U.S. PATENT DOCUMENTS, "Kawamora et al." should read --Kawamura et al.--.
Under OTHER PUBLICATIONS, "survey" should read --Survey-- and "pp. 189-1925" should read --pp. 1898-1925--.

COLUMN 1

Line 3, "OUT-PUTTING" should read --OUTPUTTING--.
Line 31, "Moire" should read --Moirè--.

COLUMN 3

Line 7, "image" should read --the image--.
Line 8, "the" should be deleted.
Line 10, "discrimiantes" should read --discriminates--.
Line 41, "a block." should read --the block.--.

COLUMN 6

Line 12, "circuit 93, 94" should read --circuits 93, 94--.
Line 47, "allow" should read --allows--.
Line 67, "dot" should read --the dot-- and "the" should be deleted.

UNITED STATES PATENT AND TRADEMARK OFFICE
CERTIFICATE OF CORRECTION

PATENT NO. : 5,157,741
DATED : October 20, 1992
INVENTOR(S) : AKIHIRO KATAYAMA

It is certified that error appears in the above-identified patent and that said Letters Patent is hereby corrected as shown below:

COLUMN 7

Line 5, "Furthermore" should read --Furthermore,--.

COLUMN 8

Line 67, "digitized by said digitizing means." should read
           --binarized by said binarizing means.--.

Signed and Sealed this

Twenty-sixth Day of October, 1993

Attest:

BRUCE LEHMAN

*Attesting Officer*     *Commissioner of Patents and Trademarks*